Patented Nov. 30, 1926.

1,608,786

UNITED STATES PATENT OFFICE.

CHARLES JEAN VICTOR FÉRY, OF PARIS, FRANCE.

ELECTROMAGNETIC DEVICE.

Application filed April 18, 1925, Serial No. 24,224, and in France April 23, 1924.

In electric clocks with motor or driving pendulum, the maintenance of motion of the hands is controlled, as well known, by an electromagnetic system consisting in a coil and a magnet, one of these parts being fixed and the other carried from the pendulum; at every vibration of the pendulum, the coil receives current from a battery and the mutual reaction of the magnet and the coil through which the current passes, maintains the pendulum in motion and allows the same to operate the works.

Among all the systems as heretofore employed, there is no one that has the properties which are absolutely required for securing a good operation, either because their electric efficiency is insufficient, which causes a strong consumption of current which reduces the life of the battery, or because the free motion of the pendulum is defective, which, in case the clock is not quite straight, results in a friction between the pendulum and the fixed part (coil or electromagnet) and consequently a stopping of the clock.

This invention has for its object an electromotive device for electric clocks with motor pendulum, so combined as to obviate the above indicated disadvantages and to comply at same time with all the conditions as required for good running.

According to its arrangement and combination, this electromotive device constitutes a system producing a high electromotive force under the action of the displacement of the coil relatively to the magnet and having, in virtue of this, a high electric efficiency; moreover, this device allows the pendulum to freely move in all the vertical planes passing through its suspension; under these conditions, this pendulum is not exposed to any accidental friction capable of stopping its motion, in case for example the clock is not in a quite straight position, or in case the pendulum would take a conical or tapered movement, as a result of an undue shifting of the clock.

The electromotive device forming the object of the invention is essentially characterized as follows:

(a) The magnet is constituted so as to produce a magnetic field comprising two vertical fluxes which are reversely directed or oriented and to leave between its poles an interferric space or gap which is very narrow so that the magnetic field thus created will be of great intensity.

(b) The coil of a very flat shape is placed horizontally inside the magnet so as to normally cross the lines of force of the magnetic field which is generated between the poles of this magnet.

The magnet is preferably carried from the pendulum and is driven along in the vibrating or oscillating motion of the latter, while the coil is fixed; however, the reverse arrangement might be adopted, that is to say the coil would be supported upon the pendulum and the magnet be fixed.

In order to make the invention clearer, two ways of carrying out the same will now be described with reference to the accompanying drawing in which:

Fig. 1 shows diagrammatically in elevation a construction of this electromotive device.

Fig. 2 is a cross vertical section.

Fig. 3 is a bottom plan view.

Fig. 4 is a detail view of the magnet.

Figs. 5 and 6 show a second construction;

Fig. 5 being an elevation view and Fig. 6 a detail view of the magnet.

In the arrangement shown in Figs. 1 to 4, the pendulum $a$ carries at its lower end, a brass cross-part $b$ to which are secured two horseshoe electromagnets $c$, $d$, similar to those which are used as deadeners or absorbers for the red copper disks or plates of electric meters; as shown in Figs. 1 and 4, the poles N S and S' N' of each one of these electromagnets are very close together and the distance between them is less than the interspace between the two electromagnets.

Between the poles N S and S' N' of these two electromagnets $c$, $d$ is placed a fixed coil $e$ consisting of a circular plate, with a vertical axis, formed of insulated copper wire; this horizontal coil is supported from an angle-iron $f$ secured to the bottom $g$ of the clock case.

The two electromagnets $c$, $d$ are so arranged that the flux generated by the electromagnet $c$ will be directed downwardly, while, on the contrary, the flux produced by the electromagnet $d$ will be directed upwardly, as shown in Fig. 4.

According to this arrangement, the fluxes produced by the two electromagnets concord together for generating currents which are added together in a same convolution of the coil $e$ with the maximum of efficiency whereas the lines of force are strictly normal to the direction of this coil when Nov. 30, 1926.
G. W. HUEY
CONTROL SYSTEM
Filed July 30, 1920
1,608,792
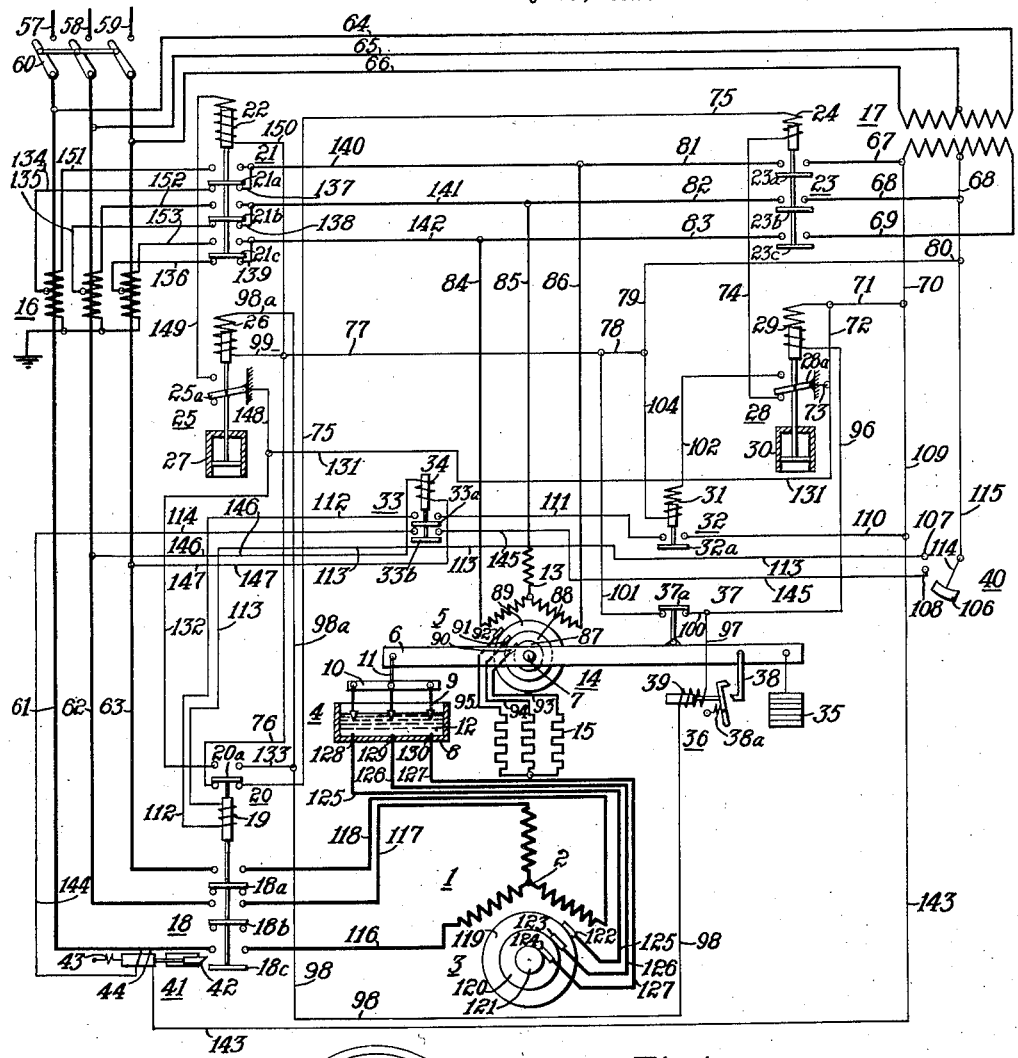
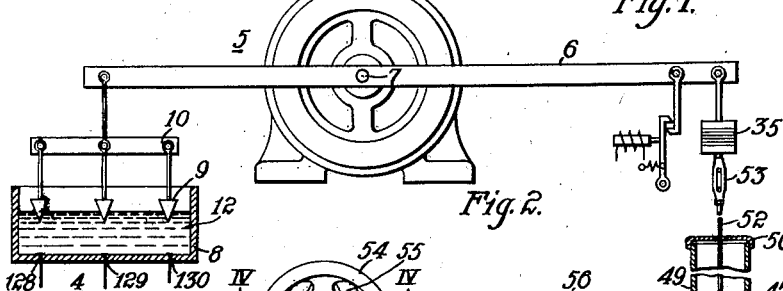
Fig. 1.
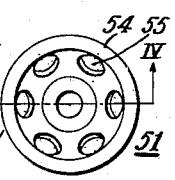
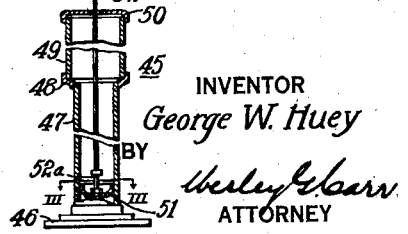
WITNESSES:
H. T. Shelhamer
W. R. Coley
INVENTOR
George W. Huey
BY
Wesley G. Carr
ATTORNEY